Feb. 5, 1924.

P. J. BERGGREN 1,482,881

TELESCOPE ADJUSTMENT

Filed Feb. 24, 1919

Witness:
H. L. Carrington

Inventor,
Per Johan Berggren
By Glenn S. Noble
Atty.

Patented Feb. 5, 1924.

1,482,881

UNITED STATES PATENT OFFICE.

PER JOHAN BERGGREN, OF CHICAGO, ILLINOIS.

TELESCOPE ADJUSTMENT.

Application filed February 24, 1919. Serial No. 278,920.

*To all whom it may concern:*

Be it known that I, PER JOHAN BERGGREN, a subject of the King of Sweden, residing at Chicago, in the county of Cook and State of Illinois, have invented certain new and useful Improvements in Telescope Adjustments, of which the following is a specification.

The longitudinal movement or adjustment of the lenses or ocular tubes of telescopes is necessary in order to focus such instruments. This adjustment has commonly been provided by means of screws co-acting with cam slots, but such arrangements have been found objectionable on account of the screws becoming loosened; and if a screw is removed and lost, it is often inconvenient to replace the same.

One of the principal objects of the present invention is the provision of longitudinal adjusting means which will have no removable parts, for the ocular pieces or lenses of telescopes or other optical instruments. The advantages of such an arrangement are particularly noticeable in connection with binoculars such as are used for army and navy purposes. It will be readily apparent that these instruments are often subjected to rough usage and are apt to become dirty and will need to be taken apart for cleaning. The loss of an adjusting screw under these circumstances may be disastrous. Therefore, it is highly desirable that such instruments have as few small or separate parts as possible.

Other objects and advantages of the present invention will appear more fully from the following description.

Figure 1:
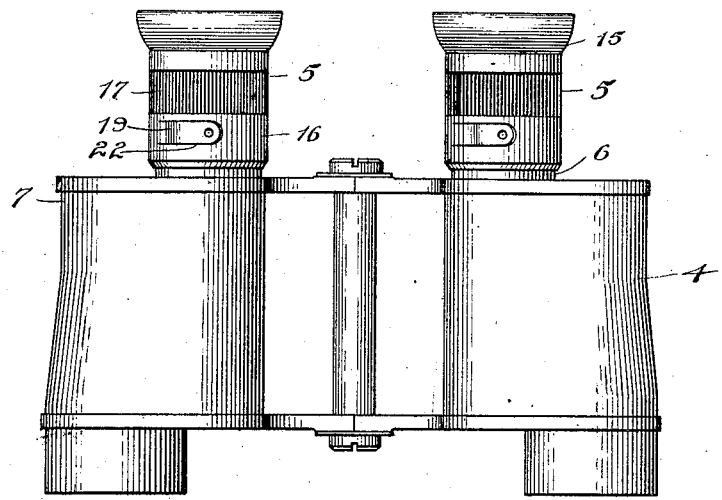
Figure 1 is a side view of a binocular telescope embodying this invention.
Figure 2:
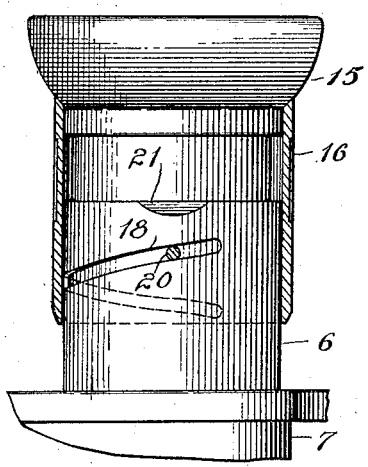
Figure 2 is a somewhat enlarged detail of the ocular piece with parts broken away to show the interior construction.
Figure 3:
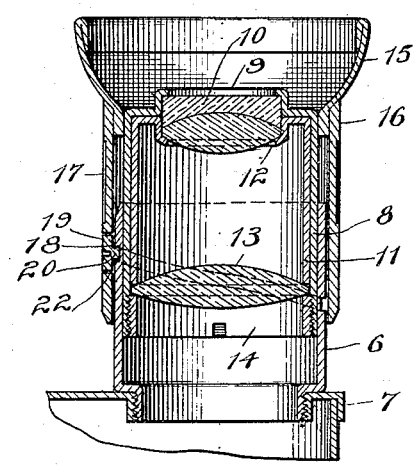
Figure 3 is a longitudinal sectional view of the ocular piece, also shown enlarged.

Although, as above stated, this invention may be applicable to various optical instruments, it will be described in connection with binoculars, and its applicability to other instruments will be understood by those familiar with the art.

In the present illustration, 4 represents a binocular of any ordinary or preferred form of construction, having two ocular tubes 5. The present invention relates to the construction of these tubes, and as they are duplicates, the description will be limited to one of them.

The tube 5 is composed of a main cylindrical member 6, which is secured in any suitable manner to the barrel 7. A second tube 8 fits in the cylindrical member or tube 6 and is provided, at its outer end, with a flange 9 for engagement with the lens 10. A third tube 11 fits in the tube 8 and is provided with a flange 12, which co-acts with the flange 9 for holding the lens 10. A lens 13 fits in the tube 8 and rests against the end of the tube 11. A threaded ring 14 engages with the correspondingly threaded end of the tube 8 and holds the parts in position. An eye-piece 15 is secured in the end of a sleeve 16 which extends down over the tube 6, and is preferably knurled, as indicated at 17, for turning the same.

The tube 6 is provided with a cam groove 18, which preferably extends only part way through the wall of the tube. The sleeve 16 is provided with a tongue 19, which is preferably formed integrally therewith, and has a projection 20 extending inwardly, for engagement with the groove 18. The metal of which the sleeve 16 is formed has sufficient resiliency so that the tongue 19 will be elastic or spring-like in order to hold the projection 20 in proper working engagement with the groove 18. It will be noted that the end of this groove terminates at some distance from the end of the tube 6, so that the tongue 19 must be sprung out to permit the projection 20 to pass over the outer surface of the tube when the parts are being assembled. In order to do this conveniently, the tube 6 is preferably beveled or tapered, as indicated at 21, so that the projection will slide up this taper when the sleeve is pressed over the tube.

All of the parts of the ocular tube are preferably made by drawing and stamping processes, so that the parts may be rapidly and cheaply made. The method of forming the tongue 19 is one of the features of the present invention. It will be noted that this tongue must move freely within the walls of its surrounding slot or opening 22. This tongue is first punched out by means of a suitable punch and die, but this, of course, leaves the tongue of substantially the same dimension as the slot, so that it will not move freely therein, but is apt to bind. In order to provide a clearance, the tongue is first bent outwardly a sufficient distance to allow access to the slot, and the walls of the slot are then trimmed off by means of a second punch and die, and the tongue is then bent down to engaging position. In this manner, a suitable clearance is provided and the tongue is free to spring in and out as the occasion demands.

It will be readily seen that, by means of my improved ocular piece, the parts may be readily manufactured and assembled, and it will be particularly noted that there are no small parts, such as screws, which are apt to become loosened or lost.

The assembly and operation of the device are apparent from the drawings. When it is desired to remove the sleeve 16, this may be done by turning it until the projection 20 rides up out of the end of the groove 18. and then moving the tube longitudinally. If desired, the end of the groove or the projection may be slightly tapered to facilitate this removal. It will be noted that in some instances a cam slot may be provided, which extends entirely through the tube 6, but I prefer the groove, as this prevents dust from entering; and the entire construction is such as to prevent the entrance of dust as fully as possible.

Having thus described my invention, which, however, I do not wish to limit to the exact construction or arrangement herein described, except as specified in the following claims, what I claim and desire to secure by Letters Patent is:

1. In a device of the character set forth, the combination of a cylindrical member having a circumferential spiral groove therein, a sleeve telescoping with said member and fitting closely thereover, said sleeve having an integrally formed yielding tongue lying entirely within the same plane as the wall of said sleeve and having a projection for engagement with said groove.

2. An ocular device of the character set forth, comprising a relatively fixed tube with a cam slot therein, an inner sleeve having a flanged outer end, a second sleeve having a flanged outer end, fitting in the first-named sleeve, a lens positioned between said flanges and held thereby, a second lens resting against the inner end of the last-named sleeve, a ring for holding said lenses and the last-named sleeve in position, an eye-piece engaging with said first-named sleeve, an outer adjusting sleeve carried by said eye-piece, said outer sleeve having a spring finger with a projection thereon for engagement with said cam slot.

3. In a device of the character set forth, the combination of a relatively fixed tube having a cam groove therein, the ends thereof terminating at some distance from the ends of the tube, said tube having a taper on the outer surface at one end thereof, a sleeve engaging with said tube, said sleeve having an integrally formed tongue in the side thereof, with a projection for engagement with said groove, the arrangement being such that the projection will pass up over the taper when the sleeve is placed in position on the tube.

PER JOHAN BERGGREN.